US011901111B2

(12) United States Patent
Yen et al.

(10) Patent No.: US 11,901,111 B2
(45) Date of Patent: Feb. 13, 2024

(54) INDUCTOR DEVICE

(71) Applicant: Realtek Semiconductor Corporation, Hsinchu (TW)

(72) Inventors: Hsiao-Tsung Yen, Hsinchu (TW); Kuan-Yu Shih, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 516 days.

(21) Appl. No.: 17/130,201

(22) Filed: Dec. 22, 2020

(65) Prior Publication Data

US 2021/0202156 A1 Jul. 1, 2021

(30) Foreign Application Priority Data

Dec. 25, 2019 (TW) ................................ 108147688

(51) Int. Cl.
*H01F 27/28* (2006.01)
*H01F 27/29* (2006.01)

(52) U.S. Cl.
CPC ......... *H01F 27/2828* (2013.01); *H01F 27/29* (2013.01)

(58) Field of Classification Search
CPC .. H01F 27/2828; H01F 27/29; H01F 17/0013; H01F 2017/0073; H01F 17/0006
USPC ........................................ 336/192, 200, 232
See application file for complete search history.

(56) References Cited

U.S. PATENT DOCUMENTS

| | | | | |
|---|---|---|---|---|
| 7,456,721 B2 * | 11/2008 | Chiu | H03H 7/42 | 336/200 |
| 2008/0042792 A1 * | 2/2008 | Chiu | H03H 7/42 | 336/200 |
| 2010/0060402 A1 * | 3/2010 | Chen | H03H 7/422 | 336/200 |

(Continued)

FOREIGN PATENT DOCUMENTS

| | | | |
|---|---|---|---|
| CN | 102110517 A * | 6/2011 | |
| CN | 102110517 A | 6/2011 | |

(Continued)

OTHER PUBLICATIONS

China Patent Office, "Office Action", dated Aug. 16, 2022, China.

*Primary Examiner* — Shawki S Ismail
*Assistant Examiner* — Kazi S Hossain
(74) *Attorney, Agent, or Firm* — Locke Lord LLP; Tim Tingkang Xia, Esq.

(57) ABSTRACT

An inductor device includes a first wire, a second wire, at least one first connector, at least one second connector, and a first center-tapped terminal. The first wire includes a plurality of first sub-wires. The second wire includes a plurality of second sub-wires. The first sub-wires and the second sub-wires are disposed in an interlaced manner. The at least one first connector couples the first sub-wire that is disposed on an outer side and the first sub-wire that is disposed on an inner side in the first sub-wires. The at least one second connector couples the second sub-wire that is disposed on the outer side and the second sub-wire that is disposed on the inner side in the second sub-wires. The first center-tapped terminal is coupled to the first sub-wire that is disposed on the outer side in the first sub-wires.

19 Claims, 4 Drawing Sheets

(56) References Cited

U.S. PATENT DOCUMENTS

2011/0133878 A1* 6/2011 Chiu .................. H01F 17/0013
336/200
2012/0044034 A1* 2/2012 Nazarian ............ H01L 23/5227
336/200
2012/0244802 A1* 9/2012 Feng .................... H04B 5/0087
336/225
2014/0077919 A1* 3/2014 Godoy .................. H01F 27/006
336/226
2016/0118180 A1* 4/2016 Chen ....................... H01F 21/12
336/170
2019/0221350 A1* 7/2019 Yen ..................... H01F 27/2804
2019/0237238 A1* 8/2019 Yen ......................... H01F 19/04
2019/0279809 A1* 9/2019 Yen ..................... H01F 17/0006

FOREIGN PATENT DOCUMENTS

CN 110060849 A 7/2019
TW I645429 B 12/2018

* cited by examiner

INDUCTOR DEVICE

RELATED APPLICATIONS

This application claims priority to Taiwan Application Serial Number 108147688, filed Dec. 25, 2019, which is herein incorporated by reference.

BACKGROUND

Field of Invention

The present disclosure relates to an electronic device. More particularly, the present disclosure relates to an inductor device.

Description of Related Art

The various types of inductors according to the prior art have their advantages and disadvantages. For example, a spiral inductor has a higher Q value and a larger mutual inductance. For a symmetric inductor, it is difficult to design it with a high inductance density, and the resonate frequency band of the symmetric inductor is low. As a result, the application ranges of the above inductors are limited.

For the foregoing reasons, there is a need to solve the above-mentioned problems by providing an inductor device.

SUMMARY

In order to resolve the above problems, one aspect of the present disclosure provides an inductor device. The inductor device includes a first wire, a second wire, at least one first connector, at least one second connector, and a first center-tapped terminal. The first wire includes a plurality of first sub-wires. The second wire includes a plurality of second sub-wires. The first sub-wires and the second sub-wires are disposed in an interlaced manner. The at least one first connector couples the first sub-wire that is disposed on an outer side and the first sub-wire that is disposed on an inner side in the first sub-wires. The at least one second connector couples the second sub-wire that is disposed on the outer side and the second sub-wire that is disposed on the inner side in the second sub-wires. The first center-tapped terminal is coupled to the first sub-wire that is disposed on the outer side in the first sub-wires.

Therefore, based on the technical content of the present disclosure, the inductor device adopting the structure according to the embodiment of the present disclosure has a better structural symmetry and quality factor (Q). In addition to that, based on the structural design of the inductor device of the embodiment of the present disclosure, the center-tapped terminals can be directly pulled out from the outer side of the inductor device, and there is no need to use methods that occupy other layers, such as jumping, etc. As a result, the structural design is facilitated. Additionally, the structural configuration of the center-tapped terminals allows them to be designed by using materials with higher current tolerance and be able to withstand a higher current.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

Figure 1:
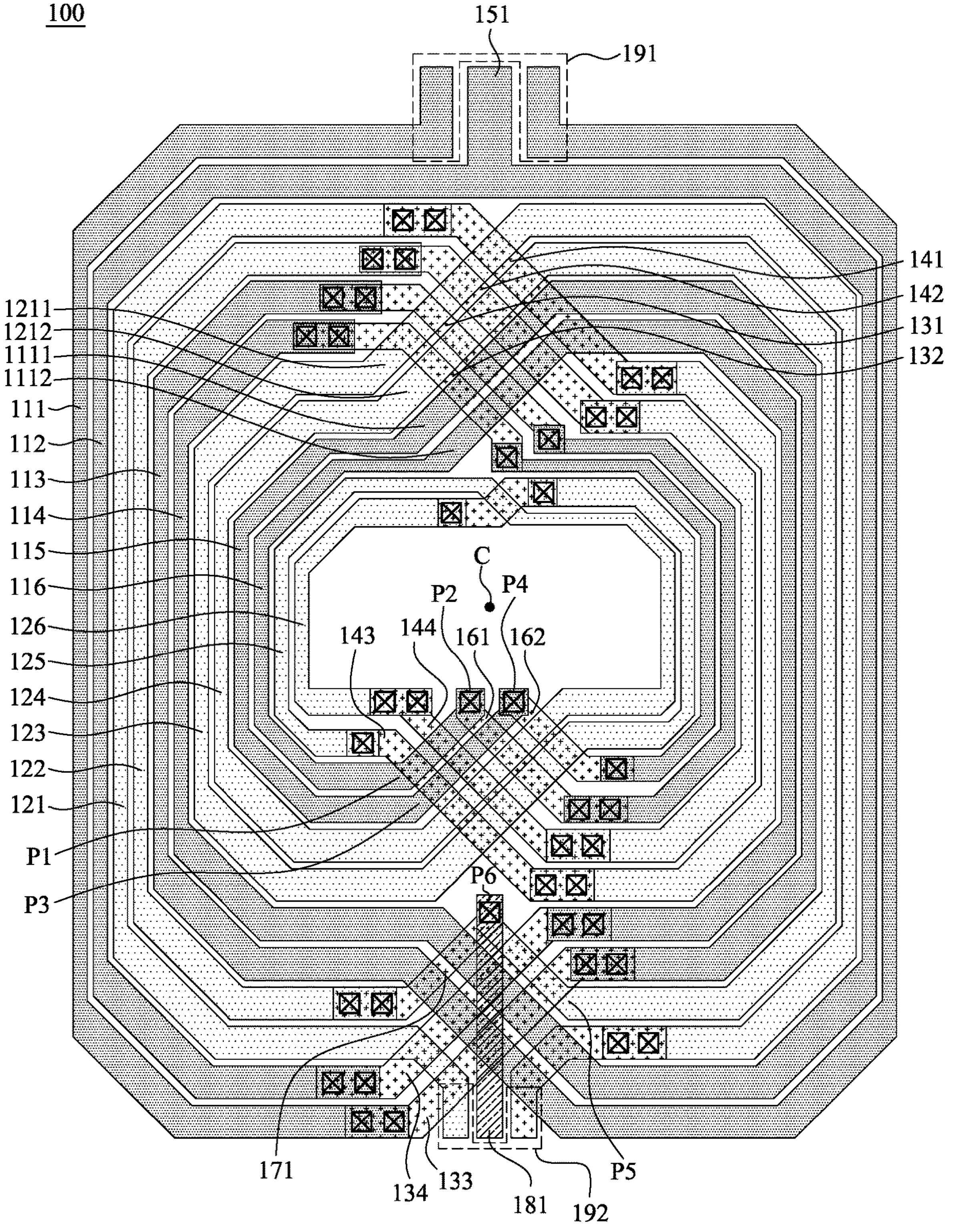
FIG. 1 depicts a schematic diagram of an inductor device according to one embodiment of the present disclosure.

FIG. 1 depicts a schematic diagram of an inductor device 100 according to one embodiment of the present disclosure. As shown in the figure, the inductor device 100 includes a first wire, a second wire, at least one first connector, at least one second connector, and a center-tapped terminal 151. The first wire includes a plurality of first sub-wires 111-116. The second wire includes a plurality of second sub-wires 121-126. The at least one first connector includes at least one of first connectors 131-134. The at least one second connector includes at least one of second connectors 141-144.

As for the structural configuration, the first sub-wires 111-116 and the second sub-wires 121-126 are disposed in an interlaced manner. In one embodiment, two first sub-wires and two second sub-wires are disposed in the interlaced manner. For example, a configuration method of the inductor device 100 may be: "the first sub-wires 111, 112, the second sub-wires 121, 122, the first sub-wires 113, 114, the second sub-wires 123, 124, the first sub-wires 115, 116, and the second sub-wires 125, 126". However, the present disclosure is not limited to the above embodiment. The first sub-wires 111-116 and the second sub-wires 121-126 may adopt a disposition method in which one first sub-wire and one second sub-wire are disposed in the interlaced manner, or a disposition method in which one of the first sub-wires and more than one of the second sub-wires are disposed in the interlaced manner, or a disposition method in which more than one of the first sub-wires and one of the second sub-wires are disposed in the interlaced manner, or adopt some other interlaced disposition method, depending on practical needs.

A description is provided with reference to FIG. 1. The at least one first connector couples the first sub-wire that is disposed on an outer side and the first sub-wire that is disposed on an inner side in the first sub-wires 111-116. For example, the first connector 131 couples the first sub-wire 113 that is disposed on the outer side and the first sub-wire 115 that is disposed on the inner side. In addition, the first connector 132 couples the first sub-wire 114 that is disposed on the outer side and the first sub-wire 116 that is disposed on the inner side. In one embodiment, the first connector 133 couples the first sub-wire 111 that is disposed on the outer side and the first sub-wire 113 that is disposed on the inner side. Additionally, the first connector 134 couples the first sub-wire 112 that is disposed on the outer side and the first sub-wire 114 that is disposed on the inner side.

In addition to that, the at least one second connector couples the second sub-wire that is disposed on the outer side and the second sub-wire that is disposed on the inner side in the second sub-wires 121-126. For example, the second connector 141 couples the second sub-wire 121 that is disposed on the outer side and the second sub-wire 123 that is disposed on the inner side. In addition, the second connector 142 couples the second sub-wire 122 that is disposed on the outer side and the second sub-wire 124 that is disposed on the inner side. In one embodiment, the second connector 143 couples the second sub-wire 123 that is disposed on the outer side and the second sub-wire 125 that is disposed on the inner side. Additionally, the second connector 144 couples the second sub-wire 124 that is disposed on the outer side and the second sub-wire 126 that is disposed on the inner side.

In one embodiment, the first center-tapped terminal 151 is coupled to the first sub-wire that is disposed on the outer side in the first sub-wires 111-116. For example, the first sub-wire 112 is classified to be disposed on the outer side of an entire structure of the inductor device 100 in the first sub-wires 111-116, and the first center-tapped terminal 151 can be coupled to the first sub-wire 112 on the outer side in configuration. In another embodiment, a description is provided with reference to an upper side of FIG. 1, the inductor device 100 further includes a first input/output terminal 191. The first input/output terminal 191 is disposed on the first sub-wire 111 that is located on an outermost side in the first sub-wires 111-116, and is disposed on an upper side of the inductor device 100. Based on the above structural configuration, the first center-tapped terminal 151 can be coupled to the first sub-wire 112 disposed on the outer side, and is directly pulled to an outermost side of the inductor device 100 through the first input/output terminal 191 without using methods that occupy other layers, such as jumping, etc. As a result, the structural design is facilitated. In addition to that, the first center-tapped terminal 151 is directly pulled out through the first input/output terminal 191, so that it can adopt a same material structure as the first sub-wire 112 to withstand a larger current. For example, the first center-tapped terminal 151 can adopt a thicker meal layer so as to withstand a larger current. For example, the first center-tapped terminal 151 and the first sub-wire 112 can be disposed on a redistribution layer (RDL), and the thicker metal layer is used as a material of the RDL. In this manner, the first center-tapped terminal 151 is able to withstand a higher current so as to be applied to large current applications.

A description is provided with reference to FIG. 1. The first sub-wires 111-116 and the second sub-wires 121-126 are disposed on a same layer. In one embodiment, the at least one first connector and the at least one second connector are disposed on a same layer. However, the present disclosure is not limited to the above embodiments. The at least one first connector and the at least one second connector may be disposed on different layers depending on practical needs. In another embodiment, the at least one first connector and the first sub-wires 111-116 are disposed on different layers, and the at least one second connector and the second sub-wires 121-126 are disposed on different layers. For example, the first connectors 131-134 may be disposed on a layer above the first sub-wires 111-116, or on a layer below the first sub-wires 111-116. In addition, the second connectors 141-144 may be disposed on a layer above the second sub-wires 121-126, or on a layer below the second sub-wires 121-126. It really depends on practical needs.

In one embodiment, the first wire further includes first sub-wires 1111, 1112. The first sub-wire 1111 is coupled to the first sub-wires 113, 115, and the first sub-wire 1112 is coupled to the first sub-wires 114, 116. Additionally, the second wire further includes second sub-wires 1211, 1212. The second sub-wire 1211 is coupled to the second sub-wires 121, 123, and the second sub-wire 1212 is coupled to the second sub-wires 122, 124. In another embodiment, at least one of the first sub-wires 111-116 and at least one of the second sub-wires 121-126, 1211, 1212 of the second wire are crossed through the at least one first connector. For example, the first sub-wire 113 and the second sub-wires 1211, 1212 are crossed through the first connector 131, and the first sub-wire 113 is coupled to the first sub-wire 115. In addition to that, the first sub-wire 114 and the second sub-wires 1211, 1212 are crossed through the first connector 132, and the first sub-wire 114 is coupled to the first sub-wire 116. In another embodiment, at least one of the second sub-wires 121-126 and at least one of the first sub-wires 111-116, 1111, 1112 of the first wire are crossed through the at least one second connector. For example, the second sub-wire 121 and the first sub-wires 1111, 1112 are crossed through the second connector 141, and the second sub-wire 121 is coupled to the second sub-wire 123. In addition, the second sub-wire 122 and the first sub-wires 1111, 1112 are crossed through the second connector 142, and the second sub-wire 122 is coupled to the second sub-wire 124.

In another embodiment, the at least one first connector crosses at least one of the first sub-wires 111-116, 1111, 1112 of the first wire and at least one of the second sub-wires 121-126, 1211, 1212 of the second wire to couple the first sub-wire that is disposed on the outer side and the first sub-wire that is disposed on the inner side in the first sub-wires 111-116. For example, the first connector 131 crosses the first sub-wires 1111, 1112 and the second sub-wires 1211, 1212 to couple the first sub-wire 113 that is disposed on the outer side and the first sub-wire 115 that is disposed on the inner side. The first connector 132 crosses the first sub-wires 1111, 1112 and the second sub-wires 1211, 1212 to couple the first sub-wire 114 that is disposed on the outer side and the first sub-wire 116 that is disposed on the inner side. In another embodiment, the at least one second connector crosses at least one of the first sub-wires 111-116, 1111, 1112 of the first wire and at least one of the second sub-wires 121-126, 1211, 1212 of the second wire to couple the second sub-wire that is disposed on the outer side and the second sub-wire that is disposed on the inner side in the second sub-wires 121-126. For example, the second connector 141 crosses the first sub-wires 1111, 1112 and the second sub-wires 1211, 1212 to couple the second sub-wire 121 that is disposed on the outer side and the second sub-wire 123 that is disposed on the inner side. The second connector 142 crosses the first sub-wires 1111, 1112 and the second sub-wires 1211, 1212 to couple the second sub-wire 122 that is disposed on the outer side and the second sub-wire 124 that is disposed on the inner side.

In one embodiment, the inductor device 100 further includes at least one third connector. The at least one third connector includes at least one of third connectors 161, 162. At least one of the first sub-wires 111-116 is wound toward a center point of the inductor device 100 to the inner side, and is coupled to another one of the first sub-wires 111-116 through the at least one third connector. For example, the first sub-wire 116 is wound in a counterclockwise direction to a lower side, and is wound in a direction toward a center point C of the inductor device 100 at a point P1 to a point P2 on the inner side, and couples the point P2 of the first sub-wire 116 to the first sub-wire 115 through the third connector 161. Additionally, the first sub-wire 115 is wound in the counterclockwise direction to the lower side, and is wound in the direction toward the center point C of the inductor device 100 at a point P3 to a point P4 on the inner side, and couples the point P4 of the first sub-wire 115 to the first sub-wire 116 through the third connector 162.

In another embodiment, the inductor device 100 further includes a fourth connector 171. One of the second sub-wires 121-126 is wound toward the center point of the inductor device 100 to the inner side, and is coupled to the same second sub-wire of the second sub-wires 121-126 through the fourth connector 171. For example, the second sub-wire 122 is wound in a clockwise direction to the lower side, and is wound in the direction toward the center point C of the inductor device 100 at a point P5 to a point P6 on the inner side, and the point P6 of the second sub-wire 122 is coupled back to the second sub-wire 122 through the fourth connector 171.

In one embodiment, the at least one third connector and the fourth connector 171 are disposed on a same side of the inductor device 100. For example, the third connectors 161, 162 and the fourth connector 171 are disposed on the lower side of the inductor device 100. In another embodiment, the third connectors 161, 162 and the fourth connector 171 are disposed on a same layer. However, the present disclosure is not limited to the above embodiments. The third connectors 161, 162 and the fourth connector 171 may be disposed on different layers depending on practical needs. For example, the third connectors 161, 162 may be disposed on a layer above the sub-wire 111-116, 121-126 and the fourth connector 171 may be disposed on a layer below the sub-wire 111-116, 121-126, or the third connectors 161, 162 may be disposed on a layer below the sub-wire 111-116, 121-126 and the fourth connector 171 may be disposed on a layer above the sub-wire 111-116, 121-126, it really depends on practical needs.

A description is provided with reference to FIG. 1. The inductor device 100 further includes a second center-tapped terminal 181. The second center-tapped terminal 181 is coupled to the second sub-wire that is located on the outer side in the second sub-wires 121-126. For example, the second center-tapped terminal 181 is coupled to the point P6 of the second sub-wire 122 that is disposed on the outer side. In one embodiment, the first center-tapped terminal 151 is disposed on a first side (such as the upper side) of the inductor device 100, and the second center-tapped terminal 181 is disposed on a second side (such as the lower side) of the inductor device 100. In another embodiment, the second center-tapped terminal 181 and the sub-wires 111-116, 121-126 are disposed on different layers, and the second center-tapped terminal 181 is disposed on a layer different from the fourth connector 171. In some embodiments, the second center-tapped terminal 181 may be disposed above the sub-wires 111-116, 121-126 and the fourth connector 171, or disposed below the sub-wires 111-116, 121-126 and the fourth connector 171, or disposed between the sub-wires 111-116, 121-126 and the fourth connector 171, it really depends on practical needs. In some other embodiments, the second center-tapped terminal 181 may be determined whether to be disposed in the inductor device 100 or not depending on needs. In other words, the inductor device 100 may not include the second center-tapped terminal 181 in some embodiments.

In one embodiment, the inductor device 100 further includes a second input/output terminal 192. The second input/output terminal 192 is disposed on the second sub-wire 121 that is located on the outermost side in the second sub-wires 121-126, and is disposed on the second side (such as the lower side) of the inductor device 100.

In another embodiment, the first side (such as the upper side) and the second side (such as the lower side) of the inductor device 100 are arranged in a first direction (such as a vertical direction), and a third side (such as a left side) and a fourth side (such as a right side) of the inductor device 100 are arranged in a second direction (such as a horizontal direction) perpendicular to the first direction. A description is provided with reference to FIG. 1. As for the structural configuration, a line width of the first sub-wires disposed on the first side (such as the upper side) and the second side (such as the lower side) is greater than a line width of the first sub-wires disposed on the third side (such as the left side) and the fourth side (such as the right side) in the first sub-wires 111-116. In addition to that, a line width of the second sub-wires disposed on the first side (such as the upper side) and the second side (such as the lower side) is greater than a line width of the second sub-wires disposed on the third side (such as the left side) and the fourth side (such as the right side) in the second sub-wires 121-126. The present disclosure adopts the structural configuration of FIG. 1 to arrange the crossing structures (such as an overall crossing structure in which the first sub-wire 113 and the second sub-wires 1211, 1212 are crossed through the first connector 131 . . . etc.) on the first side (such as the upper side) and the second side (such as the lower side) of the inductor device 100 in a uniform manner. As a result, the sub-wires on the third side (such as the left side) and the fourth side (such as the lower side) of the inductor device 100 can use the minimum line widths and line spacings, so that the inductor device 100 meets the design requirement of the smallest area and at the same time has a high mutual inductance value.

Figure 2:
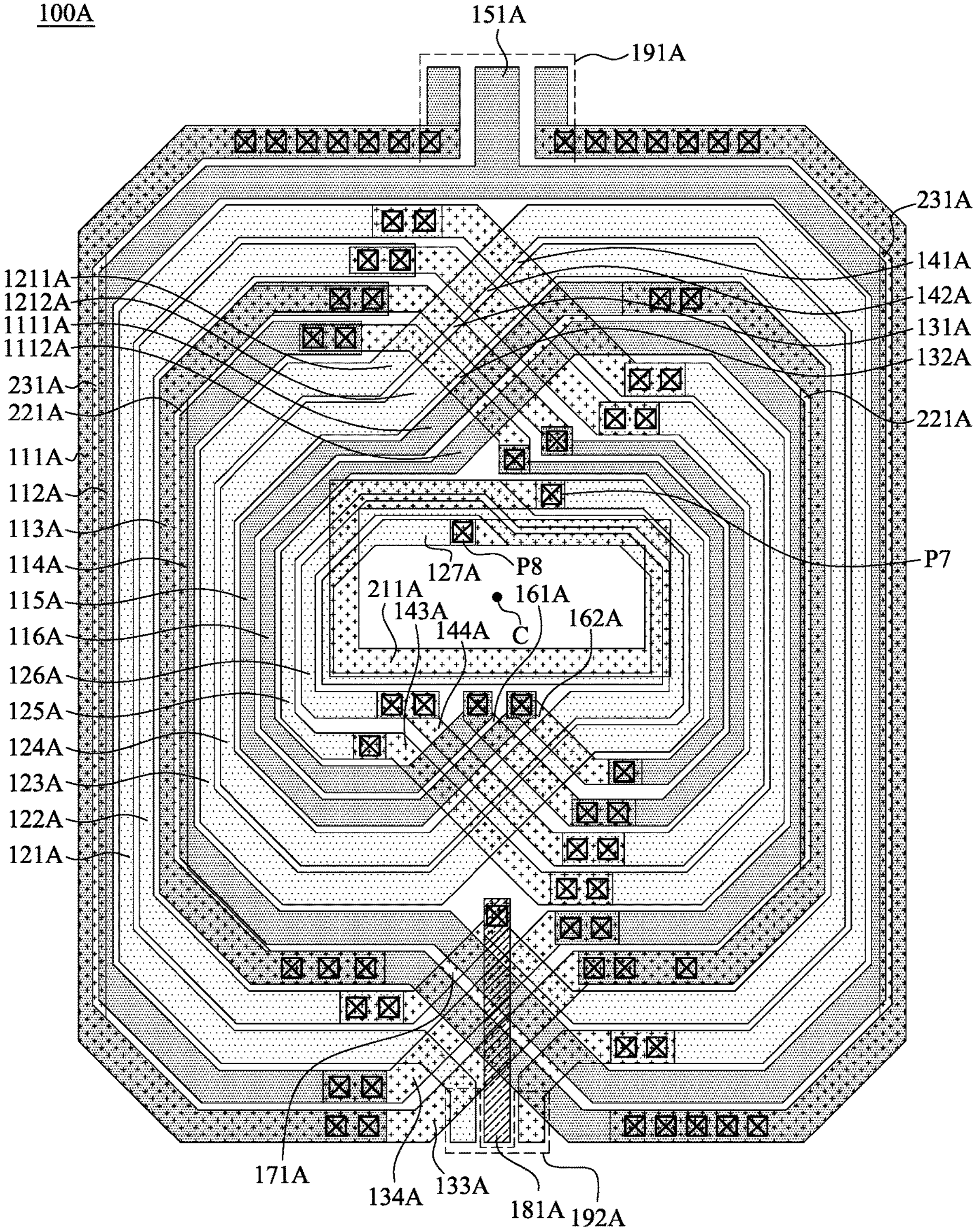
FIG. 2 depicts a schematic diagram of an inductor device according to another embodiment of the present disclosure.

FIG. 2 depicts a schematic diagram of an inductor device 100A according to another embodiment of the present disclosure. As compared with the inductor device 100 shown in FIG. 1, the inductor device 100A further includes a second sub-wire 127A, a third wire 211A, a fourth wire 221A, and a fifth wire 231A.

As shown in the figure, the second sub-wire 127A is disposed on an innermost side of second sub-wires 121A-127A. The third wire 211A is coupled to the second sub-wire 125A disposed on an inner side at a point P7, and is wound counterclockwise for one turn and is then coupled to the second sub-wire 127A disposed on the innermost side at a point P8. In one embodiment, the third wire 211A is disposed on a layer above the second sub-wire 127A, or disposed on a layer below the second sub-wire 127A depending on practical needs.

Figure 3:
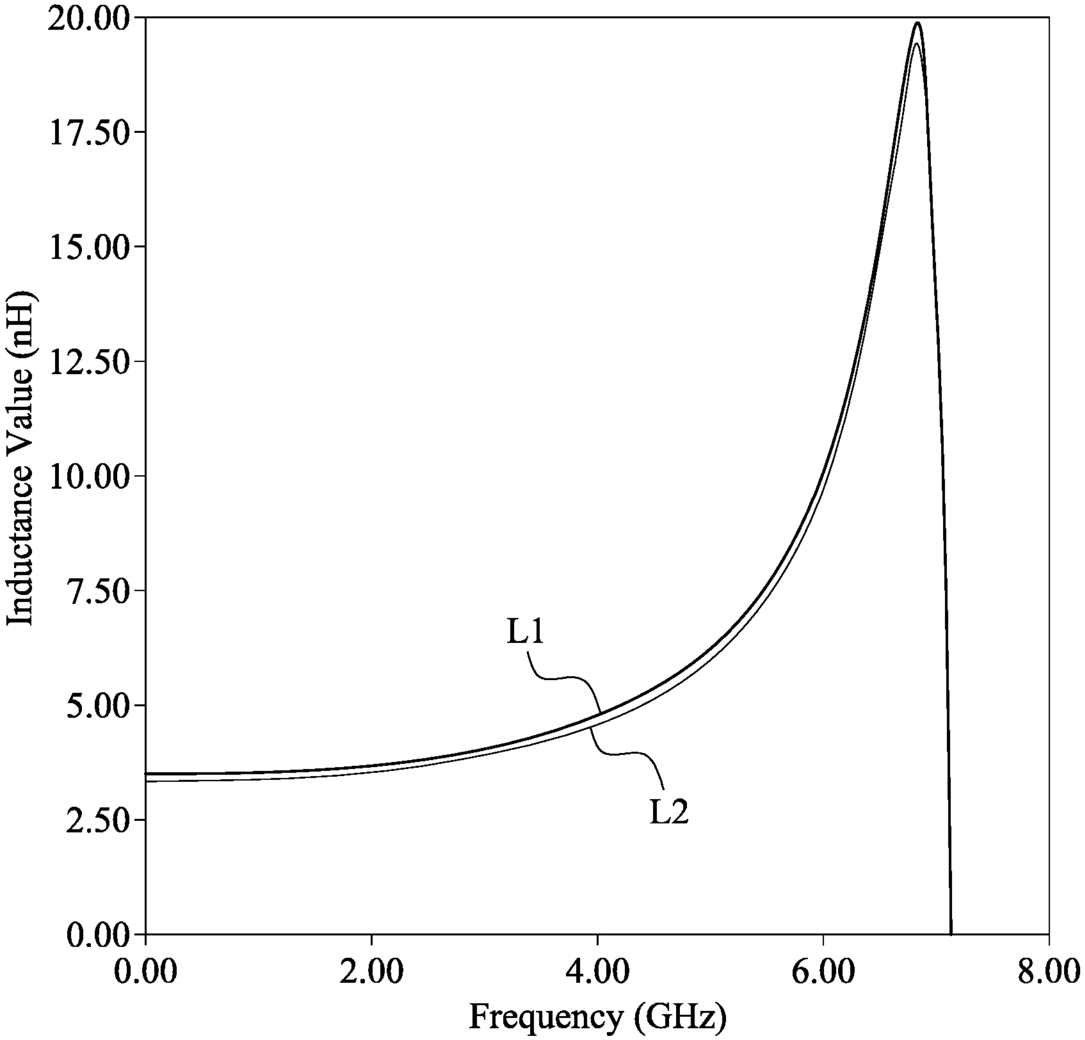
FIG. 3 depicts a schematic diagram of experimental data of an inductor device according to one embodiment of the present disclosure.

The third wire 211A in the inductor device 100A can be configured to adjust inductance values of the first wire and the second wire, so that the inductance value of the first wire and the inductance value of the second wire are approximately in a ratio of one to one. FIG. 3 depicts a schematic diagram of experimental data of an inductor device 100A according to one embodiment of the present disclosure. As shown in the figure, experimental curves L1, L2 are curves respectively showing the inductance values of the first wire and the second wire at different frequencies. It can be understood from the figure that the inductance value of the first wire and the inductance value of the second wire can be adjusted to the ratio of about one to one by adding the third wire 211A to the inductor device 100A according to the present disclosure.

A description is provided with reference to FIG. 2. The fourth wire 221A is coupled to a first sub-wire disposed in an inner side in first sub-wires 111A-116A. For example, the fourth wire 221A is coupled to the first sub-wire 113A that is disposed on the inner side. In addition, each of a left side and a right side of the inductor device 100A includes a part of a structure of the fourth wire 221A, and they are symmetrical to each other based on a center point C of the inductor device 100A. In one embodiment, the fourth wire 221A is disposed on a layer above the first sub-wire 113A, or is disposed on a layer below the first sub-wire 113A depending on practical needs.

The fifth wire 231A is coupled to the first sub-wire that is disposed on an outermost side in the first sub-wires 111A-116A. For example, the fifth wire 231A is coupled to the first sub-wire 111A that is disposed on the outermost side. Additionally, each of the left side and the right side of the inductor device 100A includes a part of a structure of the fifth wire 231A, and they are symmetrical to each other based on the center point C of the inductor device 100A. In one embodiment, the firth wire 231A is disposed on a layer above the first sub-wire 111A, or is disposed on a layer below the first sub-wire 111A depending on practical needs.

It is noted that elements of the inductor device 100A of FIG. 2 having the similar reference numbers as the elements of the inductor device 100 of FIG. 1 (for example, reference numbers of the first sub-wire 111 and the first sub-wire 111A are similar) have the same structural configuration. To simplify matters, a description in this regard is not provided in the relevant description of FIG. 2.

Figure 4:
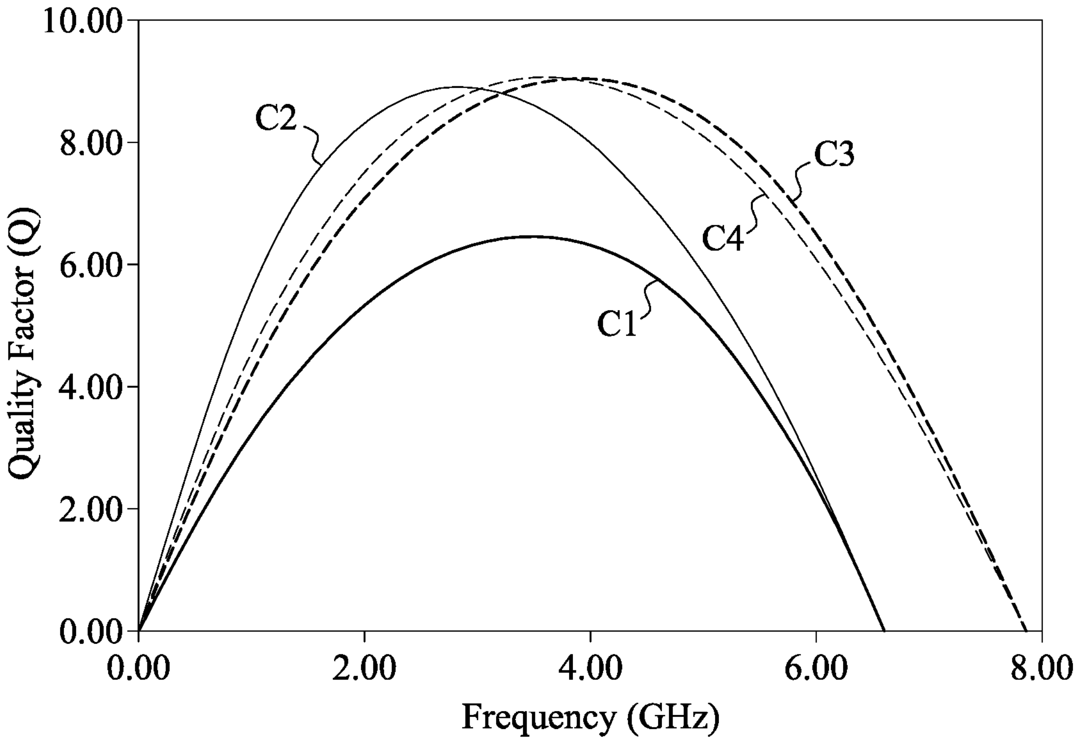
FIG. 4 depicts a schematic diagram of experimental data of an inductor device according to one embodiment of the present disclosure.

FIG. 4 depicts a schematic diagram of experimental data of the inductor device 100 shown in FIG. 1 according to one embodiment of the present disclosure. As shown in FIG. 1, the experimental curves of quality factors (0) of two wires of an inductor device without adopting the structural configuration of the present disclosure are C1, C2. In addition to that, the experimental curves of quality factors of two wires of the inductor device adopting the structural configuration of the present disclosure are C3, C4. In comparison, for the inductor device 100 adopting the structural configuration of the present disclosure, the average value of the quality factors of its two wires is about 6%-10% higher. It is thus understood that the inductor device 100 adopting the structural configuration of the present disclosure indeed has a better quality factor.

It can be understood from the embodiments of the present disclosure that application of the present disclosure has the following advantages. This present disclosure is a design with combination of symmetric inductor and spiral inductor, with novel crossing placement. The inductor device adopting the structure according to the embodiment of the present disclosure has better structural symmetry and quality factor (Q). In addition, based on the structural design of the inductor device of the embodiment of the present disclosure, the center-tapped terminals can be directly pulled out from the outer side of the inductor device, and there is no need to use methods that occupy other layers, such as jumping, etc. As a result, the structural design is facilitated. Additionally, the structural configuration of the center-tapped terminals allows them to be designed by using materials with higher current tolerance and be able to withstand a higher current.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first wire, comprising a plurality of first sub-wires;

a second wire, comprising a plurality of second sub-wires, wherein the first sub-wires and the second sub-wires are disposed in an interlaced manner;

a plurality of first connectors, each coupling the respective first sub-wire that is disposed on an outer side and the respective first sub-wire that is disposed on an inner side in the first sub-wires;

at least one second connector, coupling the second sub-wire that is disposed on an outer side and the second sub-wire that is disposed on an inner side in the second sub-wires; and a first center-tapped terminal, coupled to the first sub-wire that is disposed on the outer side in the first sub-wires, wherein each of the plurality of first connectors crosses at least one of the first sub-wires and at last one of the second sub-wires to couple the respective first sub-wire that is disposed on the outer side and the respective first sub-wire that is disposed on the inner side in the first sub-wires.

2. The inductor device of claim 1, wherein the first sub-wires and the second sub-wires are disposed on a same layer.

3. The inductor device of claim 2, wherein the plurality of first connectors and the at least one second connector are disposed on a same layer.

4. The inductor device of claim 3, wherein the plurality of first connectors and the first sub-wires are disposed on different layers, the at least one second connector and the second sub-wires are disposed on different layers.

5. The inductor device of claim 1, wherein at least one of the first sub-wires and at least one of the second sub-wires are crossed through the plurality of first connectors.

6. The inductor device of claim 1, wherein at least one of the second sub-wires and at least one of the first sub-wires are crossed through the at least one second connector.

7. The inductor device of claim 1, wherein the at least one second connector crosses at least one of the first sub-wires and at least one of the second sub-wires to couple the second sub-wire that is disposed on the outer side and the second sub-wire that is disposed on the inner side in the second sub-wires.

8. The inductor device of claim 1, further comprising:

at least one third connector, wherein one of the first sub-wires is wound toward a center point of the inductor device to an inner side, and is coupled to another one of the first sub-wires through the at least one third connector.

9. The inductor device of claim 8, further comprising:

a fourth connector, wherein one of the second sub-wires is wound toward the center point of the inductor device to the inner side, and is coupled to the one of the second sub-wires in the second sub-wires through the fourth connector.

10. The inductor device of claim 9, wherein the at least one third connector and the fourth connector are disposed on a same side of the inductor device.

11. The inductor device of claim 1, further comprising:

a second center-tapped terminal, coupled to the second sub-wire that is disposed on the outer side in the second sub-wires.

12. The inductor device of claim 11, wherein the first center-tapped terminal is disposed on a first side of the inductor device, and the second center-tapped terminal is disposed on a second side of the inductor device.

13. The inductor device of claim 12, further comprising:

a first input/output terminal, disposed on the first sub-wire that is located on an outermost side in the first sub-wires, and is disposed on the first side of the inductor device.

14. The inductor device of claim 13, further comprising:

a second input/output terminal, disposed on the second sub-wire that is located on the outermost side in the second sub-wires, and is disposed on the second side of the inductor device.

15. The inductor device of claim 14, wherein the first side and the second side of the inductor device are arranged in the first direction, a third side and a fourth side of the inductor device are arranged in a second direction perpendicular to the first direction, wherein a line width of the first sub-wires disposed on the first side and the second side is greater than a line width of the first sub-wires disposed on the third side and the fourth side in the first sub-wires.

16. The inductor device of claim 15, wherein a line width of the second sub-wires disposed on the first side and the second side is greater than a line width of the second sub-wires disposed on the third side and the fourth side in the second sub-wires.

17. The inductor device of claim 1, further comprising:

a third wire, coupled to two of the second sub-wires disposed on the inner side in the second sub-wires.

18. The inductor device of claim 17, further comprising:

a fourth wire, coupled to the first sub-wire that is disposed on the inner side in the first sub-wires.

19. The inductor device of claim 18, further comprising:

a fifth wire, coupled to the first sub-wire that is disposed on an outermost side in the first sub-wires.

* * * * *